United States Patent
Rezk

(10) Patent No.: US 11,520,835 B2
(45) Date of Patent: Dec. 6, 2022

(54) LEARNING SYSTEM, LEARNING METHOD, AND PROGRAM

(71) Applicant: RAKUTEN GROUP, INC., Tokyo (JP)

(72) Inventor: Martin Rezk, Tokyo (JP)

(73) Assignee: RAKUTEN GROUP, INC., Tokyo (JP)

(*) Notice: Subject to any disclaimer, the term of this patent is extended or adjusted under 35 U.S.C. 154(b) by 361 days.

(21) Appl. No.: 16/649,990

(22) PCT Filed: Sep. 28, 2018

(86) PCT No.: PCT/JP2018/036461
§ 371 (c)(1),
(2) Date: Mar. 24, 2020

(87) PCT Pub. No.: WO2020/065970
PCT Pub. Date: Apr. 2, 2020

(65) Prior Publication Data
US 2021/0224323 A1 Jul. 22, 2021

(51) Int. Cl.
*G06Q 30/00* (2012.01)
*G06F 16/906* (2019.01)
(Continued)

(52) U.S. Cl.
CPC ........ *G06F 16/906* (2019.01); *G06F 16/9538* (2019.01); *G06N 20/00* (2019.01)

(58) Field of Classification Search
CPC ... G06F 16/906; G06F 16/9538; G06N 20/00; G06K 9/6256
See application file for complete search history.

(56) References Cited

U.S. PATENT DOCUMENTS

| | | | |
|---|---|---|---|
| 2006/0143175 A1* | 6/2006 | Ukrainczyk | G06F 40/117 707/E17.084 |
| 2013/0124439 A1* | 5/2013 | Yamamoto | G06F 40/30 706/12 |

(Continued)

FOREIGN PATENT DOCUMENTS

WO 2011148571 A1 12/2011

OTHER PUBLICATIONS

Elyan, Eyad, Laura Jamieson, and Adamu Ali-Gombe. "Deep learning for symbols detection and classification in engineering drawings." Neural networks 129 (2020): 91-102.*

*Primary Examiner* — Kathleen Palavecino
(74) *Attorney, Agent, or Firm* — HEA Law PLLC

(57) ABSTRACT

To enhance the accuracy of a learner in semi-supervised learning, learning means of a learning system (S) causes the learner, which is configured to classify symbol information included in each of a plurality of documents, to learn based on training data indicating an attribute value of each of a plurality of attributes. Acquisition means inputs each of the plurality of documents to the learner to acquire the symbol information classified by the learner as an attribute value candidate. Determination means determines whether a symbol or a symbol string indicated by the attribute value candidate satisfies a predetermined condition. Additional learning control means controls, based on a determination result obtained by the determination means, additional learning by the learner using the attribute value candidate.

13 Claims, 10 Drawing Sheets

(51) Int. Cl.
*G06N 20/00* (2019.01)
*G06F 16/9538* (2019.01)

(56) References Cited

U.S. PATENT DOCUMENTS

2017/0169013 A1* 6/2017 Sarikaya ............. G06F 16/9535
2021/0073532 A1* 3/2021 Torres .................. G06N 3/0445

* cited by examiner

FIG.4

| PAGE ID | ACCOMMODATION FACILITY NAME | BASIC INFORMATION | CATEGORY | KEYWORD | ATTRIBUTE | ATTRIBUTE VALUE |
|---|---|---|---|---|---|---|
| p00001 | HOTEL AAA | ... DAIBA, MINATO CITY, TOKYO | HIGH-CLASS ACCOMMODATION | SUITE ROOM ... | ROOM SIZE | 60m² |
| | | | | | FLOOR | 9th FLOOR |
| | | | | | BED WIDTH | 140cm |
| | | | | | NUMBER OF ROOMS | 3 ROOMS |
| | | | | | ... | ... |
| p00002 | HOTEL BBB | ... SHIBA, MINATO CITY, TOKYO | BUSINESS HOTEL | LOW COST ... | ROOM SIZE | 20m² |
| | | | | | FLOOR | 5th FLOOR |
| | | | | | BED WIDTH | 120cm |
| | | | | | NUMBER OF ROOMS | 1 ROOM |
| | | | | | ... | ... |
| ... | ... | ... | ... | ... | ... | ... |

| ATTRIBUTE | ATTRIBUTE VALUE |
|---|---|
| ROOM SIZE | 10m² |
| | 20m² |
| | 30m² |
| | ⋮ |
| FLOOR | 1st FLOOR |
| | 2nd FLOOR |
| | 3rd FLOOR |
| | ⋮ |
| ⋮ | ⋮ |

DT

LEARNING SYSTEM, LEARNING METHOD, AND PROGRAM

CROSS REFERENCE TO RELATED APPLICATIONS

This application is a National Stage of International Application No. PCT/JP2018/036461 filed on Sep. 28, 2018. The contents of the above document is incorporated herein by reference in its entirety.

TECHNICAL FIELD

The present invention relates to a learning system, a learning method, and a program.

BACKGROUND ART

There is known in the related art a learner configured to classify documents, for example, web pages. In order to enhance the accuracy of learners, it is important to enhance the accuracy of training data, but it takes a lot of time and effort to prepare highly accurate training data from the beginning. For this reason, there is a method called "semi-supervised learning", which causes the learner to learn with a little amount of training data at first, and adds symbol information, to which the learner has assigned an attribute, to the training data as a new attribute value. In semi-supervised learning, the training data is gradually expanded by repeating learning by the learner and addition of attribute values.

In semi-supervised learning, there may be cases in which the accuracy of the learner is not sufficiently enhanced due to the assignment of an attribute to symbol information that is not originally an attribute value. Therefore, consideration has been given to adding, to the training data, only symbol information having a probability of being an attribute value that is equal to or more than a threshold value (e.g., Patent Literature 1).

CITATION LIST

Patent Literature

[PTL 1] WO 2011/148571 A1

SUMMARY OF INVENTION

Technical Problem

However, even when symbol information having a probability equal to or more than a threshold value is added to training data as in Patent Literature 1, it is very difficult to set a threshold value that enables symbol information that is not originally an attribute value to be eliminated. For this reason, in the related-art semi-supervised learning, the accuracy of the learner is not sufficiently enhanced.

One or more embodiments of the present invention has been made in view of the above-mentioned issues. It is an object of the present invention to provide a learning system, a learning method, and a program, which enable the accuracy of a learner in semi-supervised learning to be enhanced.

Solution to Problem

In order to solve the above-mentioned issues, a learning system according to one embodiment of the present invention includes: learning means for causing a learner, which is configured to classify symbol information included in each of a plurality of documents, to learn based on training data indicating an attribute value of each of a the plurality of attributes; acquisition means for inputting each of the plurality of documents to the learner to acquire the symbol information classified by the learner as an attribute value candidate; determination means for determining whether a symbol or a symbol string indicated by the attribute value candidate satisfies a predetermined condition; and additional learning control means for controlling, based on a determination result obtained by the determination means, additional learning by the learner using the attribute value candidate.

A learning method according to one embodiment of the present invention includes: a learning step of causing a learner, which is configured to classify symbol information included in each of a plurality of documents, to learn based on training data indicating an attribute value of each of a plurality of attributes; an acquisition step of inputting each of the plurality of documents to the learner to acquire the symbol information classified by the learner as an attribute value candidate; a determination step of determining whether a symbol or a symbol string indicated by the attribute value candidate satisfies a predetermined condition; and an additional learning control step of controlling, based on a determination result obtained in the determination step, additional learning by the learner using the attribute value candidate.

A program according to one embodiment of the present invention causes a computer to function as: learning means for causing a learner, which is configured to classify symbol information included in each of a plurality of documents, to learn based on training data indicating an attribute value of each of a plurality of attributes; acquisition means for inputting each of the plurality of documents to the learner to acquire the symbol information classified by the learner as an attribute value candidate; determination means for determining whether a symbol or a symbol string indicated by the attribute value candidate satisfies a predetermined condition; and additional learning control means for controlling, based on a determination result obtained by the determination means, additional learning by the learner using the attribute value candidate.

Further, in one aspect of the present invention, the additional learning control means is configured to restrict an addition of an attribute value candidate for which the determination result obtained by the determination means is not a predetermined result to the training data as a new attribute value, and restrict additional learning by the learner using the attribute value candidate.

Further, in one aspect of the present invention, the determination means is configured to determine whether or not the symbol or the symbol string indicated by the attribute value candidate has less than a predetermined number of characters.

Further, in one aspect of the present invention, the determination means is configured to determine whether the symbol or the symbol string indicated by the attribute value candidate is a specific type of symbol or symbol string.

Further, in one aspect of the present invention, each of the plurality of documents is written in a markup language, and the determination means is configured to determine whether the symbol or the symbol string indicated by the attribute value candidate is a tag portion.

Further, in one aspect of the present invention, the additional learning control means is configured to control additional learning by the learner using the attribute value candidate based further on an appearance frequency of the attribute value candidate.

Further, in one aspect of the present invention, the additional learning control means is configured to control additional learning by the learner using the attribute value candidate based further on a probability of the attribute value candidate, which is calculated by the learner.

Further, in one aspect of the present invention, the learning system further includes generation means for generating initial data of the training data by extracting, from each of the plurality of documents, symbol information written in a predetermined notation pattern as an attribute value.

Further, in one aspect of the present invention, the generation means is configured to generate the initial data by acquiring an appearance frequency of each of a plurality of notation patterns from each of the plurality of documents, and extracting, as an attribute value, symbol information written in a notation pattern appearing in a predetermined frequency or more.

Further, in one aspect of the present invention, the learning means is configured to cause a first learner to learn based on the training data, the acquisition means is configured to input each of the plurality of documents to the first learner to acquire, as a first attribute value candidate, symbol information to which an attribute has been assigned by the first learner, the learning means is configured to cause a second learner to learn based on the first attribute value candidate, the acquisition means is configured to input each of a plurality of documents to the second learner to acquire, as a second attribute value candidate, symbol information to which an attribute has been assigned by the second learner, the determination means is configured to determine whether the symbol or the symbol string indicated by each of the first attribute value candidate and the second attribute value candidate satisfies the predetermined condition, and the additional learning control means is configured to control additional learning using each of the first attribute value candidate and the second attribute value candidate based on a determination result obtained by the determination means.

Further, in one aspect of the present invention, the acquisition means is configured to input, to the second learner, each of a plurality of documents different from the plurality of documents input to the first learner.

Advantageous Effects of Invention

According to one or more embodiments of the present invention, the accuracy of the learner in semi-supervised learning is enhanced.

BRIEF DESCRIPTION OF DRAWINGS

FIG. 4 is a table for showing an example of a web page database.

FIG. 5 is a table for showing an example of training data.

DESCRIPTION OF EMBODIMENTS

1. Hardware Configuration of Learning System

Figure 1:
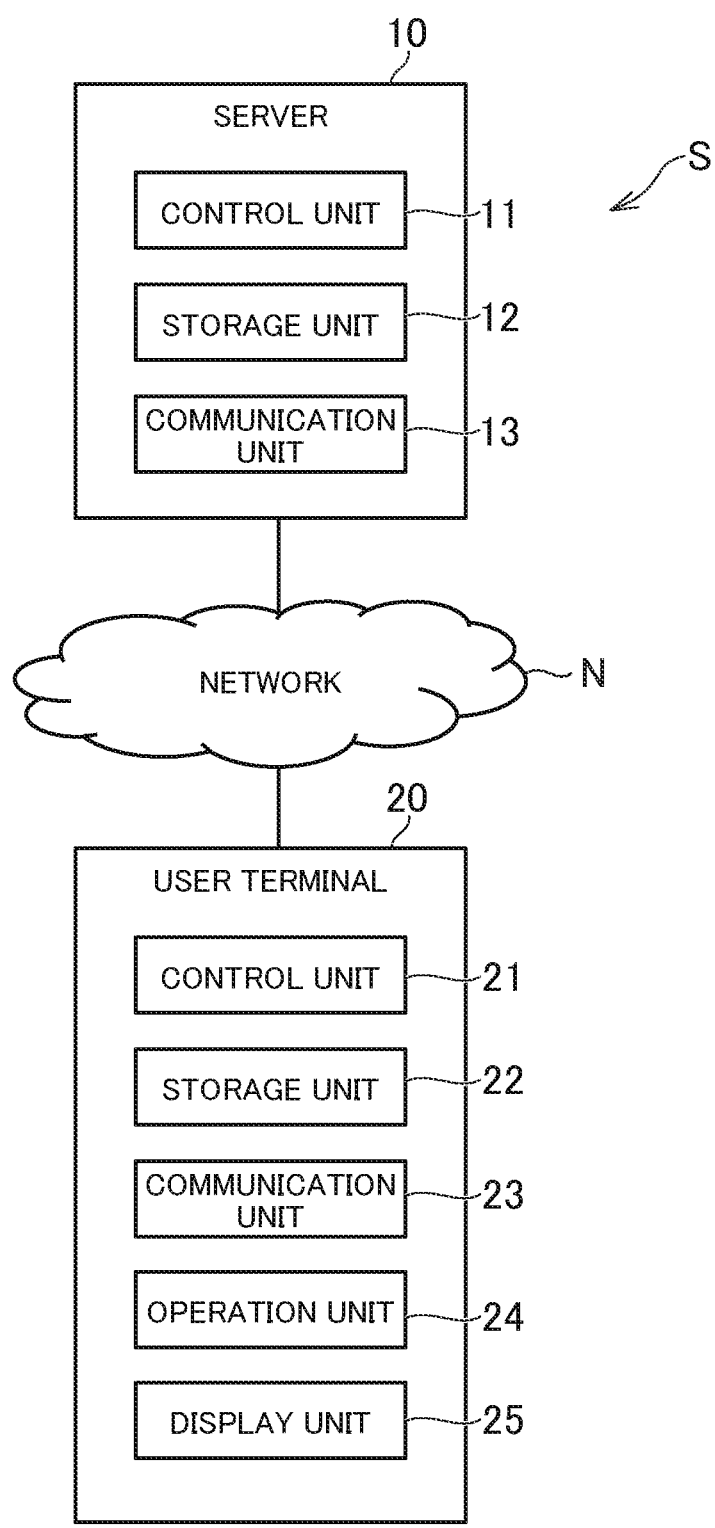
FIG. 1 is a diagram for illustrating an overall configuration of a learning system according to an embodiment of the present invention.

Now, there is described an example of a learning system according to an exemplary embodiment of the present invention. FIG. 1 is a diagram for illustrating an overall configuration of the learning system. As illustrated in FIG. 1, a learning system S includes a server 10 and a user terminal 20, which are connected to a network N. In FIG. 1, one server 10 and one user terminal 20 are illustrated, but a plurality of servers 10 and a plurality of user terminals 20 may be arranged.

The server 10 is a server computer, and includes, for example, a control unit 11, a storage unit 12, and a communication unit 13. The control unit 11 includes at least one processor. The control unit 11 is configured to execute processing in accordance with a program and data stored in the storage unit 12. The storage unit 12 includes a main memory unit and an auxiliary storage unit. For example, the main memory unit is a volatile memory, for example, a RAM, and the auxiliary storage unit is a non-volatile memory such as a hard disk drive or a flash memory. The communication unit 13 includes a communication interface for wired communication or wireless communication, and communicates data via a network, for example.

The user terminal 20 is a computer to be operated by a user, and is, for example, a personal computer, a portable information terminal (including tablet computer), or a cell phone (including smartphone). The user terminal 20 includes a control unit 21, a storage unit 22, a communication unit 23, an operation unit 24, and a display unit 25. Hardware configurations of the control unit 21, the storage unit 22, and the communication unit 23 may be the same as those of the control unit 11, the storage unit 12, and the communication unit 13, respectively. The operation unit 24 is an input device for operation by the user, and is, for example, a pointing device such as a touch panel or a mouse, or a keyboard. The operation unit 24 transmits details of operation of the user to the control unit 21. The display unit 25 is, for example, a liquid crystal display unit or an organic EL display unit.

Programs and data to be described as being stored in the storage units 12 and 22 may be supplied thereto via a network. Further, hardware configurations of the server 10 and the user terminal 20 are not limited to the above-mentioned example, and various kinds of pieces of hardware may be employed. For example, the server 10 and the user terminal 20 may each include a reading unit (e.g., optical disc drive or memory card slot) configured to read a computer-readable information storage medium, and an input/output unit (e.g., USB port) for directly connecting to an external device. In this case, programs and data stored in the information storage medium may be supplied to the server 10 or the user terminal 20 via the reading unit or the input/output unit.

2. Outline of Learning System

In this embodiment, in the learning system S, documents are retrieved based on a search condition input by a user. The file format of the documents may be various formats, for example, an HTML file, an XML file, a text file, or a rich text file.

In this embodiment, a web page written in HTML is described as an example of a document. Therefore, the words "web page" in this embodiment may be read as "document". A web page may be a page of various genres. In this embodiment, a page of an accommodation facility is described as an example. For example, the server 10, which is managed by an operator of a travel reservation service, is configured to comprehensively manage the web pages of accommodation facilities.

For example, a user inputs a search condition, such as a place of stay or a date of stay, from the user terminal 20. The server 10 retrieves the web pages of the accommodation facilities matching the search condition. The server 10 transmits the search results to the user terminal 20, and the user terminal 20 displays a list of the accommodation facilities retrieved in the search. When the user selects an accommodation facility from among the search results, the web page of the selected accommodation facility is displayed on the display unit 25.

Figure 2:
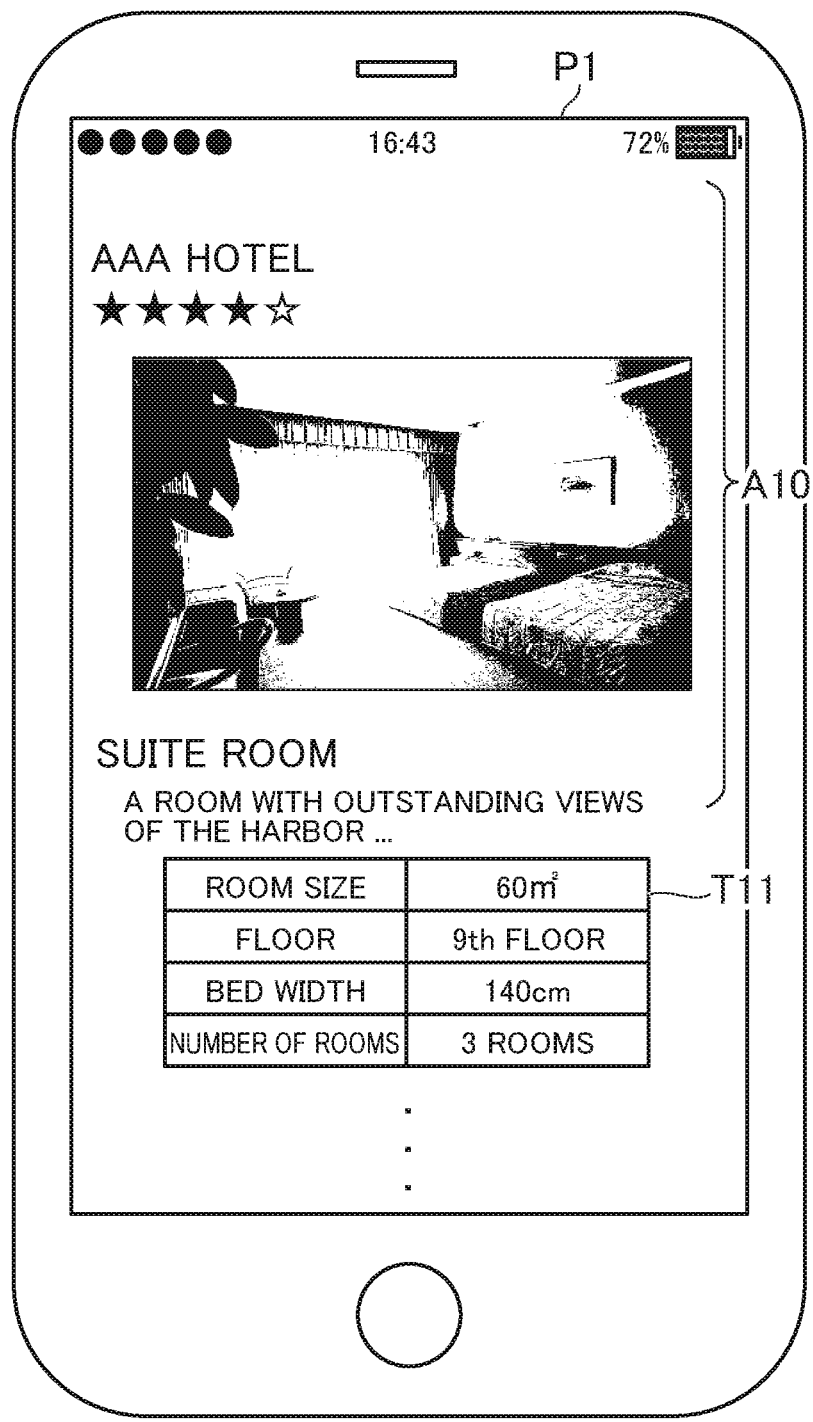
FIG. 2 is a diagram for illustrating an example of a web page.

FIG. 2 is a diagram for illustrating an example of a web page. As illustrated in FIG. 2, information on the accommodation facility selected by the user is displayed on a web page P1. For example, information on the name of the accommodation facility, a room name, an image of the room, an introductory description about the room, and the like is displayed in a display area A10. The information, for example, the introductory description about the room, is used as an index at the time of the search.

In this embodiment, the web page P1 is semi-structured, and includes an unstructured portion and a structured portion.

The unstructured portion is a portion that is not structured in the web page P1. In other words, the unstructured portion may be a portion in which a format is not defined, a portion in which a layout is not defined, or a portion in which it is not determined where or what information is to be described. For example, the unstructured portion includes freely input text or a freely attached image. In this embodiment, the accommodation facility describes the unstructured portion in any manner that is desired.

The structured portion is a portion that is structured in the web page P1. In other words, the structured portion may be a portion described in a predetermined format, a portion in which the layout is predetermined, or a portion in which it is determined where and what information is to be described. For example, the structured portion is a table, a chart, a figure, or structured text. In this embodiment, it is assumed that the operator of the travel reservation service defines the format of the structured portion. The accommodation facility describes the structured portion in accordance with the format defined by the operator.

As illustrated in FIG. 2, the web page P1 includes information, for example, the introductory description to be displayed in the display area A10, as an unstructured portion, and includes a table T11 as a structured portion. For example, in the display area A10, text freely input by the accommodation facility and an image freely attached by the accommodation facility are displayed. Further, for example, in the table T11, information created by the accommodation facility in accordance with a predetermined format is displayed. Attributes are stored in the first column of the table T11, and attribute values are stored in the second column of the table T11.

An attribute is a type of information included in the web page. In other words, an attribute may also be referred to as a meaning, classification, nature or characteristic of the information included in the web page. In the example of FIG. 2, information on the "room size", "floor", "bed width", and "number of rooms" is stored in the table T11, and hence the names of those pieces of information are written as the attributes. The attributes are not limited to those examples, and any attribute that is suitable for the content of the web page may be set. For example, in the case of an accommodation facility, there may be attributes such as a room type and a number of people who can stay.

The attribute values are the details of the information included in the web page. In other words, the attribute values are the specific content of the information included in the web page. Each attribute value is indicated by a symbol or a symbol string. A symbol is a medium for transmitting information, and may be, for example, a character, a number, a mark, or a picture. A symbol string is a collection of two or more characters. In the example of FIG. 2, "60 m$^2$", "9th floor", "140 cm", and "3 rooms" are stored in the table T11 as the attribute values for the "room size", "floor", "bed width", and "number of rooms", respectively.

In this embodiment, the attributes are freely input by the accommodation facility. For this reason, even for the same attribute, there may be variations in notation. For example, depending on the accommodation facility, the attribute "room size" may be input as "room area" or even as "floor area". For example, depending on the accommodation facility, the attribute "floor" may be input as "level" or even as "level number". The learning system S takes into account the variations in attribute notation, and integrates the attributes that have different notations but have the same meaning. This point is described in more detail later.

In this embodiment, the attribute values are also freely input by the accommodation facility. For this reason, various notation patterns exist for the attribute values. For example, the attribute "room size" may be expressed by a combination of an integer and a unit, such as "60 m$^2$" or "70 m$^2$", or may be expressed as a combination of a numerical value including information after the decimal point and a unit, such as "60.25 m$^2$" or "70.3 m$^2$". Further, for example, depending on the accommodation facility, a numerical value may be expressed through use of Japanese or Chinese characters. For example, depending on the accommodation facility, another unit such as square feet may be used in place of "m$^2$", or the unit may be expressed through use of Japanese or Chinese characters. The learning system S extracts information on frequently appearing notation patterns as attribute values to increase the attribute value coverage. This point is described in more detail later.

In the learning system S, attributes and attribute values are extracted from the web page P1 and used as a search index. In this embodiment, combinations of the attributes and the attribute values are stored in the table T11. The table T11 is a structured portion, and hence the combinations of the attributes and the attribute values can be extracted relatively easily. Therefore, combinations of the attributes and the attribute values are extracted from the table T11 of the web page P1 and used as an index.

Regarding this point, in the web page P1, an abundant amount of information on the accommodation facility is included not only in the table T11 but also in the display area A10, which is an unstructured portion. Therefore, the accuracy of a search may be enhanced by extracting the attribute values from the display area A10. However, the introductory description and the like of the display area A10 are freely input by the accommodation facility, and hence, even by referring to only that text, it is difficult to identify which attribute value of which attribute is described.

Therefore, the learning system S generates training data based on combinations of the attributes and the attribute values extracted from the table T11, and causes a learner configured to classify web pages to learn. The learner analyzes the words in the introductory description and the like of the accommodation facility included in the web page, and assigns an attribute to the words presumed to be the attribute value of the learned attribute. As a result, the words included in the introductory description and the like of the accommodation facility can be used as an index, and the accuracy of the search can be enhanced.

The learner learns by using the training data, and hence in order to enhance the classification accuracy of the learner, it is important to prepare highly accurate training data. However, it takes a lot of time and effort to prepare highly accurate training data from the beginning. For this reason, the learning system S uses semi-supervised learning to cause the learner to learn by using less training data at first, and then uses the learner to add to the training data the attribute values extracted from web pages. Through gradually expanding the training data, the time and effort required for preparing training data is reduced.

However, at first, the accuracy of the learner is not very high, and hence something that is not originally an attribute value may be erroneously detected as an attribute value. For example, symbols such as "*" and ";", which are not originally attribute values, may be erroneously detected as attribute values of the "room size" attribute. For example, a long character string that is not originally information indicating the room size may be erroneously detected as an attribute value of the attribute of "room size". In semi-supervised learning, learning is performed repeatedly, and hence once erroneous information that is not originally an attribute value is added to the training data, the learner that has learned based on the erroneous information tends to detect even more erroneous information as an attribute value. Specifically, in the case of semi-supervised learning, in which learning is repeatedly performed, a decrease in accuracy leads to a further decrease in accuracy, and hence the accuracy of the learner tends to decrease due to erroneous detection of the attribute value.

Therefore, the learning system S enhances the accuracy of the learner by determining whether or not a symbol or a symbol string detected by the learner as an attribute value candidate satisfies a predetermined condition, and preventing symbol information that is not originally an attribute value from being added to the training data. The configuration of the learning system S is now described in more detail.

3. Functions to be Implemented in this Embodiment

Figure 3:
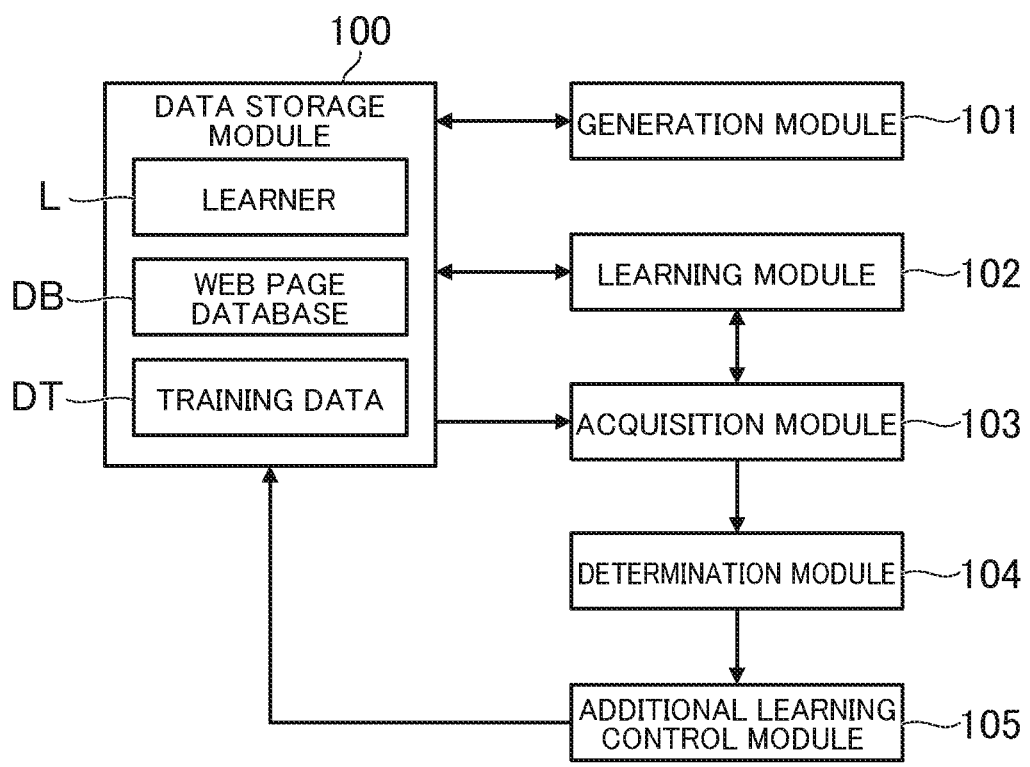
FIG. 3 is a functional block diagram for illustrating an example of functions to be implemented by the learning system.

FIG. 3 is a functional block diagram for illustrating an example of functions to be implemented by the learning system S. As illustrated in FIG. 3, in this embodiment, a data storage unit 100, a generation module 101, a learning module 102, an acquisition module 103, a determination module 104, and an additional learning control module 105 are implemented by the server 10. The data storage unit 100 is mainly implemented by the storage unit 12, and the generation module 101, the learning module 102, the acquisition module 103, the determination module 104, and the additional learning control module 105 are each mainly implemented by the control unit 11.

[3-1. Data Storage Unit]

The data storage unit 100 is configured to store various types of data relating to web pages. For example, the data storage unit 100 stores a learner L, a web page database DB, and training data DT.

A program of the learner L is stored in the data storage unit 100. In other words, an algorithm of the learner L is stored in the data storage unit 100. As the learner L, various types of learner L used in semi-supervised learning may be employed. For example, the learner L may be a convolutional neural network, a recursive neural network, or a conditional random field (CRF).

The learner L is configured to classify symbol information included in each of a plurality of web pages. For example, the learner L calculates a feature vector indicating a feature of symbol information included in an input web page. The feature vector is a feature quantity of a symbol or a symbol string indicated by the symbol information, and may be calculated by using, for example, Word2vec, Glove, or fastText. The learner L calculates, based on the calculated feature vector and the attribute value of each learned attribute, a probability of the symbol information belonging to each attribute.

For example, the learning module 102, which is described later, causes the learner L to learn which area in the feature space each attribute is assigned to. The learner L calculates, based on the direction the feature vector of the symbol information is pointing, the probability of the information belonging to each attribute. For example, the learner L may assign the attribute having the highest probability to the symbol information, or may assign an attribute having a probability equal to or higher than a threshold value to the symbol information. The attribute assigned to the symbol information is the classification result by the learner L, and is a label assigned by the learner L to the symbol information. The label is a classification of the symbol information, and may be any information that enables the attribute to be identified. For example, the label may be an ID for identifying the attribute, or may be the name of the attribute.

FIG. 4 is a table for showing an example of the web page database DB. As shown in FIG. 4, the web page database DB stores various information on web pages. For example, information on the name of the accommodation facility, basic information on the accommodation facility, the category of the accommodation facility, keywords extracted from the introductory description in the web page, attributes, and attribute values are stored in the web page database DB in association with a page ID for uniquely identifying the web page. Those pieces of information are used as an index at the time of the search.

The basic information on the accommodation facility is information specific to the accommodation facility, for example, information on an address, a telephone number, or an email address. The category is a category to which the accommodation facility belongs among a plurality of categories, for example, a category such as a luxury hotel, a hot spring inn, or a business hotel. The keyword is any word in the introductory description of the accommodation facility. A word matching a word determined in advance may be extracted as the keyword, or a keyword designated for search by the accommodation facility may be stored.

The attributes and attribute values are the attributes and attribute values extracted by the learner L from the web page. As described above, the learner L assigns an attribute as a label to the symbol information in the web page. The web page database DB stores the attributes assigned by the learner L to the text information in the web page. The web page database DB also stores symbol information to which an attribute is assigned as an attribute value. In this embodiment, an attribute assigned as a label by the learner L may be removed based on a determination result obtained by the determination module 104, which is described later, and hence, when an attribute has not been removed from the web page database DB, the combination of the attribute and the attribute value is stored.

The data stored in the web page database DB is not limited to the example described above. For example, the web page database DB may also store various types of information including a URL of a web page, a storage location of web page data in the data storage unit 100, the text of the introductory description included in a web page, image data, and table data.

FIG. 5 is a table for showing an example of training data DT. As shown in FIG. 5, data for causing the learner L to learn is stored in the training data DT. For example, in the training data DT, combinations of attributes and attribute values are stored. In FIG. 5, the name of the attribute is shown, but the ID of the attribute (ID of the label) may be stored.

For the training data DT, the initial data is generated by the generation module 101, which is described later, and symbol information to which the learner L has assigned an attribute as a label is added as an attribute value. However, as described above, the attribute assigned by the learner L may be removed based on the determination result obtained by determination module 104, and hence symbol information from which an attribute has not been removed is added as an attribute value to the training data DT. In other words, the attribute of symbol information that is not originally an attribute value may be removed, and hence symbol information determined to be an attribute value is added to the training data DT.

The training data DT is used for the learning by the learner L, but the training data is a list of combinations of attributes and attribute values, and hence the training data DT may also be used to set a search condition. For example, combinations of attributes and attribute values indicated by the training data DT may be displayed on the user terminal 20, and the user may select an attribute and an attribute value as a search condition. In this case, a search is executed by using the attribute and attribute value selected by the user as a query and the attributes and attribute values stored in the web page database DB as an index.

The data stored in the data storage unit 100 is not limited to the example described above. The data storage unit 100 may store data required for the processing in the embodiment. For example, the data storage unit 100 may store the actual data of the web pages.

[3-2. Generation Module]

The generation module 101 is configured to extract, from each of a plurality of web pages, symbol information written in a predetermined notation pattern as an attribute value, and generate the initial data of the training data DT. The initial data is the training data DT to be used in the first learning.

The notation pattern is a pattern of the notation of the symbol or the symbol string indicated by the symbol information, and may also be referred to as "POS tag sequence" or "part-of-speech tag sequence". When the symbol information is a one-character symbol, the notation pattern is a one-character symbol type. When the symbol information is a symbol string, the notation pattern is the arrangement of the symbols in the symbol string.

In this embodiment, the notation pattern is expressed as the sequence of the types of parts of speech. For example, in the case of the symbol information "10 $m^2$", the notation pattern is [number, noun]. As another example, in the case of the symbol information "15.25 $m^2$", the notation pattern is [number, symbol, number, noun].

For example, the generation module 101 extracts the symbol information included in a web page. In this embodiment, the generation module 101 extracts symbol information from the structured portion of the web page. For example, in the example of FIG. 2, the generation module 101 extracts the symbol information from the table T11 of the web page P1. In this example, the information that can be an attribute value is stored in the second column of the table T11, and hence the generation module 101 extracts the symbol information stored in the second column of the table T11 to identify a notation pattern. The notation pattern may be identified by using a part-of-speech breakdown tool in natural language processing. The part-of-speech breakdown tool analyzes the symbol information based on dictionary data defining the parts of speech, and breaks down the symbol information into parts of speech.

The generation module 101 generates the initial data by acquiring an appearance frequency of each of a plurality of notation patterns from each of a plurality of web pages, and extracting the symbol information written in notation patterns appearing in a predetermined frequency or more as the attribute values.

The appearance frequency is the frequency in which a notation pattern appears. The generation module 101 acquires the appearance frequency by counting the number of each notation pattern based on a result of identifying the notation patterns. The notation patterns may be counted irrespective of attributes, but in this embodiment, the generation module 101 acquires the appearance frequency by counting the number of notation patterns for each attribute.

The predetermined frequency may be any frequency set as a threshold value. For example, the predetermined frequency may be set to a value such as the top several tens of percent of the whole, or a value such as the absolute number of the appearance frequency is equal to or more than a predetermined number. The generation module 101 determines whether or not the appearance frequency of each notation pattern is equal to or more than the predetermined frequency, extracts, as an attribute value, the symbol information on the notation pattern determined to have an appearance frequency of the predetermined frequency or more, and generates the initial data for the training data DT.

For example, in the case of the attribute "room size", a notation pattern of [number, noun] such as "10 $m^2$", and a notation pattern of [number, symbol, number, noun] such as "15.25 $m^2$", often appear, and hence the occurrence frequency is very high. For this reason, those notation patterns are used as notation patterns for extracting attribute values.

Meanwhile, when the accommodation facility erroneously inputs as "17*] $m^2$", for example, the notation pattern becomes [number, symbol, symbol, noun]. Such a notation pattern is not usually used to indicate "room size", and is merely an erroneous input, and hence the occurrence frequency is very low. For this reason, the notation pattern is not used as a notation pattern for extracting attribute values. Other than erroneous inputs, for example, notation patterns that are used only in some regions of a country are not used as notation patterns for extracting attribute values because their occurrence frequency is low.

[3-3. Learning Module]

The learning module 102 is configured to cause the learner L, which is configured to classify the symbol information included in each of a plurality of web pages, to learn based on the training data DT indicating the attribute value of each of a plurality of attributes. The learning module 102 causes the learner L to learn by adjusting a coefficient of the algorithm of the learner L based on the training data DT.

For example, the learning module 102 calculates a feature vector of the attribute value of each attribute indicated in the training data DT. The calculation of the feature vector may be the same as the calculation of the feature vector of the character information. For example, Word2vec, Glove, or fastText may be used. The learning module 102 assigns an area corresponding to each attribute in a feature space based on the feature vector of each attribute value. Then, the learning module 102 calculates the probability of the symbol information belonging to each attribute based on the feature vector of the symbol information in the web page and the area corresponding to each attribute, and adjusts the coefficient of the algorithm of the learner L such that an attribute is assigned as a label. The method described above is an example of the learning method, and the learning using the training data DT may be performed by applying various methods used in semi-supervised machine learning.

In this embodiment, the learning module 102 causes the learner L to learn based on the initial data of the training data DT generated by the generation module 101. The learning based on the initial data is the first learning, and when the training data DT has been expanded by the additional learning control module 105, which is described later, the learning module 102 causes the learner L to learn based on the expanded training data DT. In other words, the learning module 102 causes the learner L to additionally learn based on the expanded training data DT.

The learning module 102 may cause the learner L to learn each time the training data DT is expanded, or may cause the learner L to learn when the training data DT has been expanded a plurality of times. As another example, the learning module 102 may cause the learner L to learn when the number of new attribute values added to the training data DT becomes equal to or more than a threshold value, or when a predetermined date and time arrives, the learning module 102 may cause the learner L to learn based on the training data DT at that point in time.

[3-4. Acquisition Module]

The acquisition module 103 is configured to input each of a plurality of web pages to the learner L to acquire symbol information classified by the learner L as an attribute value candidate. When a web page is input to the learner L, the learner L extracts the symbol information from the web page. For example, the learner L divides the sentences in the introductory description or the like of a web page into clauses, and extracts individual clauses as symbol information.

The learner L calculates a feature vector of each piece of symbol information, and based on the feature vector, assigns an attribute as a label to the piece of symbol information. The acquisition module 103 acquires, as attribute value candidates, the symbol information to which the learner L has assigned attributes as labels. The learner L may process only the symbol information included in the unstructured portion of the web page, or may process the symbol information included in the structured portion as well.

The attribute value candidates are symbol information that may become an attribute value. In other words, the attribute value candidates are symbol information presumed by the learner L to be attribute values. As described above, an attribute may be assigned to symbol information that is not originally an attribute value, and hence the determination module 104, which is described below, determines whether or not each attribute value candidate is actually an attribute value. An attribute value candidate determined to be an attribute value by the determination module 104 becomes a new attribute value.

[3-5. Determination Module]

The determination module 104 is configured to determine whether or not the symbol or the symbol string indicated by the attribute value candidate satisfies a predetermined condition.

The predetermined condition is a condition for determining whether or not the attribute value candidate is an attribute value. In other words, the predetermined condition is a condition for identifying attribute value candidates that are not originally an attribute value but have been detected as an attribute value. Various conditions can be set as the predetermined condition, and the predetermined condition may be, for example, a condition regarding the appearance of the attribute value candidate or a condition regarding the number of characters of the attribute value candidate. An example of the predetermined condition is now described. It is sufficient for the determination module 104 to determine at least one of the conditions described below. The determination module 104 may determine only one of those conditions, or may determine each of a plurality of conditions.

For example, the determination module 104 may determine whether or not the symbol or the symbol string indicated by the attribute value candidate has less than a predetermined number of characters. The predetermined number of characters may be a number defined as a threshold value, and may be, for example, one character or may be 30 characters. The determination module 104 counts the number of characters of the attribute value candidate, and determines whether or not the number of characters is less than the predetermined number of characters.

For example, the determination module 104 determines whether or not the symbol or the symbol string indicated by the attribute value candidate is a specific type of symbol or symbol string. The specific type of symbol or symbol string may be a type determined in advance, and may be, for example, an alphabetic character or a Japanese or Chinese character. The determination module 104 refers to a character code of the attribute value candidate, and determines whether or not the character code is the specific type of symbol or symbol string.

In this embodiment, each of the plurality of web pages is written in a markup language, and hence the determination module 104 may determine whether or not the symbol or the symbol string indicated by the attribute value candidate is a tag portion. A markup language is an artificial language for embedding information in a document using specific notation, and is, for example, HTML, XML, TeX, or SGML. The tag may be any tag defined in a markup language, for example, a TABLE tag, a HEAD tag, a TITLE tag, or a BODY tag. The determination module 104 determines whether or not the attribute value candidate is a tag portion by determining whether or not the attribute value candidate is surrounded by specific symbols such as "<" or ">".

[3-6. Additional Learning Control Module]

The additional learning control module 105 is configured to control additional learning by the learner L using attribute value candidates based on the determination result obtained by the determination module 104.

Additional learning is to cause the learner L to additionally learn. In other words, additional learning is to cause the learner L to learn based on expanded training data DT. The additional learning control is to control whether or not an attribute value candidate is to be used in additional learning.

For example, in additional learning, as a new attribute value, the additional learning control module 105 uses an attribute value candidate for which the determination result obtained by the determination module 104 is a predetermined result. The additional learning control module 105 adds the attribute value candidate for which the determination result obtained by the determination module 104 is a predetermined result as a new attribute value to the training data DT, and executes additional learning by the learner L using the attribute value candidate. In other words, the additional learning control module 105 restricts the addition of attribute value candidates for which the determination result obtained by the determination module 104 are not a predetermined result to the training data DT as new attribute values, and restricts additional learning by the learner L using those attribute value candidates. The predetermined result may be set in accordance with the condition of the determination module 104, and an example of the predetermined result is described below.

In this embodiment, there is described a case in which the additional learning control module 105 removes, from the attribute value candidates, attributes for which the determination result obtained by the determination module 104 is not a predetermined result, and does not use those attributes. However, in place of removing such attributes, the attributes may also be prevented from being used in additional learning by preparing a flag indicating those attributes are not to be used in additional learning, and setting a flag value. More specifically, the additional learning control module 105 may prevent attribute value candidates from being added to the training data DT by removing, from the attribute value candidates, attributes for which the determination result obtained by the determination module 104 is not a predetermined result, or may prevent such attribute value candidates from being added to the training data DT by setting a flag value.

As another example, the additional learning control module 105 may be configured not to use an attribute value candidate to which an attribute has been assigned in additional learning by leaving the attribute value candidate as it is without adding the attribute value candidate to the training data DT or by removing the attribute value candidate itself. The attribute value candidates that are not used in additional learning do not become attribute values, and hence those attribute value candidates are not used as the web page index.

For example, the additional learning control module 105 removes an attribute from the attribute value candidate when it is determined that the symbol or the symbol string indicated by an attribute value candidate has less than the predetermined number of characters. For example, the additional learning control module 105 may remove an attribute from the attribute value candidate when the number of characters of the attribute value candidate is one, or when the number of characters of the attribute value candidate is less than three.

Further, for example, the additional learning control module 105 may remove an attribute from the attribute value candidate when it is determined that the symbol or the symbol string indicated by an attribute value candidate has the predetermined number of characters or more. For example, the additional learning control module 105 removes an attribute from the attribute value candidate when the number of characters of the attribute value candidate is equal to or more than 30.

For example, the additional learning control module 105 removes an attribute from the attribute value candidate when it is determined that the symbol or the symbol string indicated by the attribute value candidate is a specific type of symbol or symbol string. For example, the additional learning control module 105 may remove an attribute from the attribute value candidate when the attribute value candidate is a symbol of a type such as "*" or ";", or may remove an attribute from the attribute value candidate when an attribute value candidate having less than a predetermined number of characters is an alphabetic character.

Further, for example, the additional learning control module 105 removes an attribute from the attribute value candidate when it is determined that the symbol or the symbol string indicated by the attribute value candidate is a tag portion. For example, the additional learning control module 105 removes an attribute from the attribute value candidate when the attribute value candidate is a tag portion such as a TABLE tag, a HEAD tag, a TITLE tag, or a BODY tag.

The additional learning control module 105 may remove an attribute from the attribute value candidate based on the determination result of each of a plurality of conditions. For example, the additional learning control module 105 may remove an attribute from the attribute value candidate when it is determined that the symbol or the symbol string indicated by the attribute value candidate has less than a predetermined number of characters and is a specific type of symbol or symbol string. For example, an attribute may be removed from the attribute value candidate when the attribute value candidate has less than three characters and is an alphabetic character. In this way, the determination result of each of a plurality of conditions may be used in combination.

For example, the additional learning control module 105 may control additional learning in consideration of information other than the determination result obtained by the determination module 104. For example, the additional learning control module 105 may control additional learning by the learner L using the attribute value candidates based further on the appearance frequency of the attribute value candidates. The additional learning control module 105 determines whether or not the appearance frequency of an attribute value candidate is equal to or more than a threshold value. The additional learning control module 105 does not remove an attribute from the attribute value candidate when it is determined that the appearance frequency of the attribute value candidate is equal to or more than the threshold value, and removes an attribute from the attribute value candidate when it is determined that the appearance frequency of the attribute value candidate is less than the threshold value.

For example, the additional learning control module 105 may control additional learning by the learner L using the attribute value candidates based further on a probability of an attribute value candidate, which is calculated by the learner L. The additional learning control module 105 determines whether or not the probability of an attribute value candidate is equal to or more than a threshold value. The additional learning control module 105 does not remove an attribute from the attribute value candidate when it is determined that the probability of the attribute value candidate is equal to or more than the threshold value, and removes an attribute from the attribute value candidate when it is determined that the probability of the attribute value candidate is less than the threshold value.

In the learning system S, the processing of each of the above-mentioned learning module 102, the acquisition module 103, the determination module 104, and the additional learning control module 105 is repeatedly performed many times, and the training data DT is gradually expanded.

4. Processing to be Executed in this Embodiment

Figure 6:
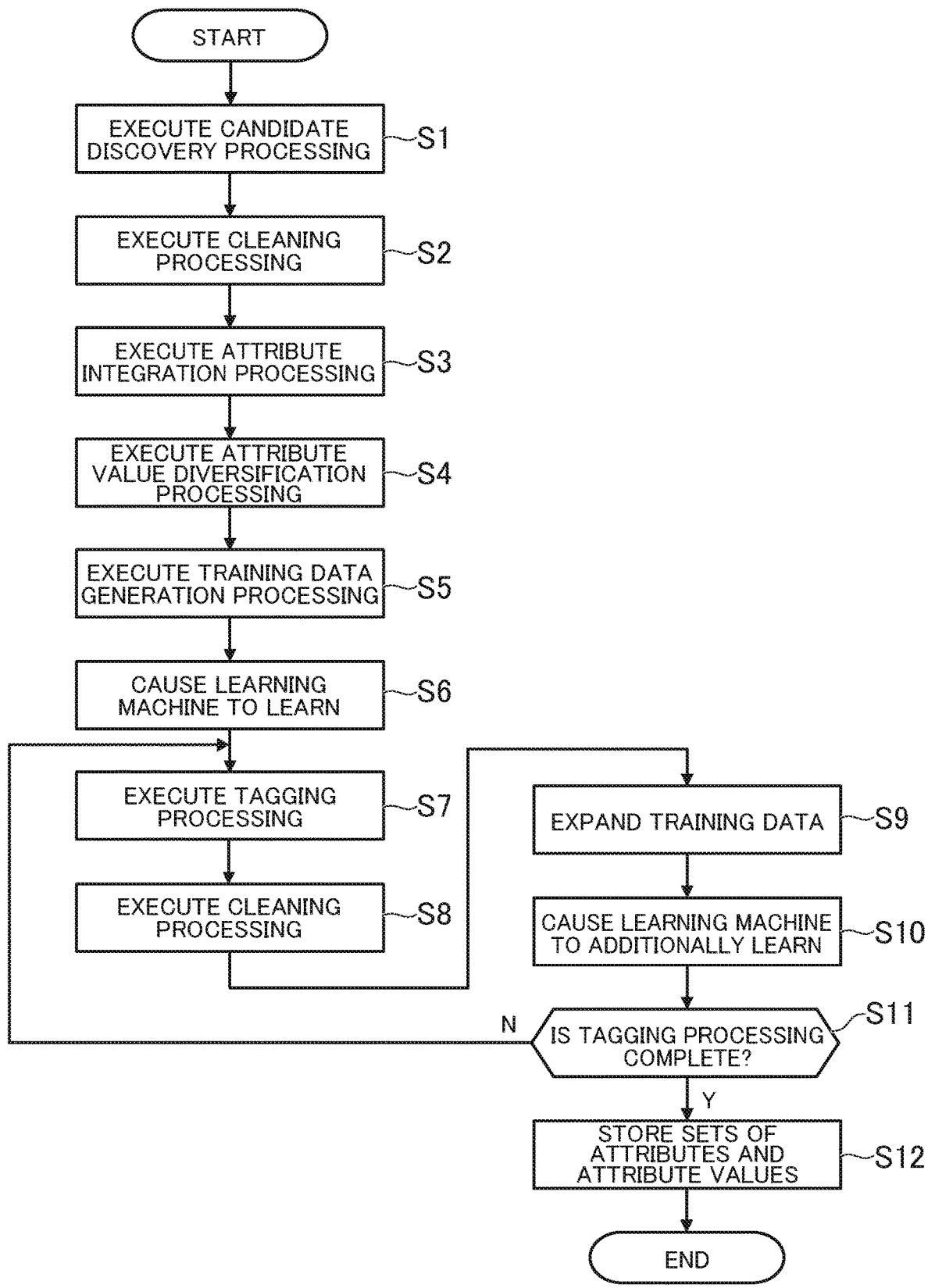
FIG. 6 is a flowchart for illustrating processing to be executed by a server.

FIG. 6 is a flowchart for illustrating processing to be executed by the server 10. The processing illustrated in FIG. 6 is executed by the control unit 11 operating based on a program stored in the storage unit 12. The processing illustrated in FIG. 6 is an example of the processing to be executed by the functional blocks illustrated in FIG. 3.

As illustrated in FIG. 6, the control unit 11 executes candidate discovery processing based on the web page database DB (Step S1). The candidate discovery processing is processing of discovering attribute candidates and attribute value candidates from web pages. In other words, the candidate discovery processing can be said to be processing of discovering candidates for a web page index, or processing of discovering candidates for a constituent element of the training data DT.

The candidate discovery processing may target all of the web pages, or may target only a part of the web pages. When the discovery processing targets only a part of the web pages, the control unit 11 may randomly select a predetermined number of web pages, or may execute the candidate discovery processing by targeting web pages identified as including a table.

In Step S1, the control unit 11 determines whether or not a TABLE tag exists in each of the plurality of web pages stored in the web page database DB, and identifies the presence or absence of a table in each of the plurality of web pages. The control unit 11 extracts from the web pages including a table the information stored in the table as a candidate. For example, the first column of the table is set as the attribute candidates, and the second column of the table is extracted as attribute value candidates.

The control unit 11 executes cleaning processing (Step S2). The cleaning processing of Step S2 is processing of excluding attribute value candidates that are unsuitable as attribute values. In Step S2, the control unit 11 excludes attribute value candidates that satisfy a predetermined exclusion condition. The exclusion condition may be any condition. For example, attribute value candidates having a difference from another attribute value candidate of equal to or more than a threshold value may be excluded, or attribute value candidates having an appearance frequency of less than a threshold value may be excluded.

The control unit 11 executes attribute integration processing (Step S3). As described above, there may be variations in the notation of the names of the attributes, and hence the attribute integration processing is processing of integrating the attributes by taking into account the variations in notation of the names extracted as attribute candidates. The term "integration" refers to grouping, as the same attribute, names having different notation but the same meaning. For example, any of the grouped names may be used as the name of the attribute. The name of the attribute may be randomly selected from the grouped names, or the name having the highest appearance frequency may be used as the name of the attribute.

In Step S3, the control unit 11 determines whether or not the meaning of each of the attribute candidates is the same, and integrates the attributes having the same meaning. In other words, the control unit 11 takes into account the variations in the notation of the attributes. In this example, it is assumed that synonym data in which synonyms are defined is stored in the storage unit 12 in advance. The control unit 11 refers to the synonym data, and integrates names having the same meaning as the same attribute.

The control unit 11 executes attribute value diversification processing (Step S4). The attribute value diversification processing is processing of increasing the variation of the attribute values. In this example, the variation of the attribute values is increased by extracting a plurality of notation patterns as attribute values in place of using only a specific notation pattern as the attribute values. However, when the notation patterns are increased too much, the accuracy of the training data may decrease as a result of attribute values that are not originally attribute values becoming mixed in or minor notation pattern attribute values becoming mixed in, and hence consideration is given to the appearance frequency of the notation patterns as described below.

Figure 7:
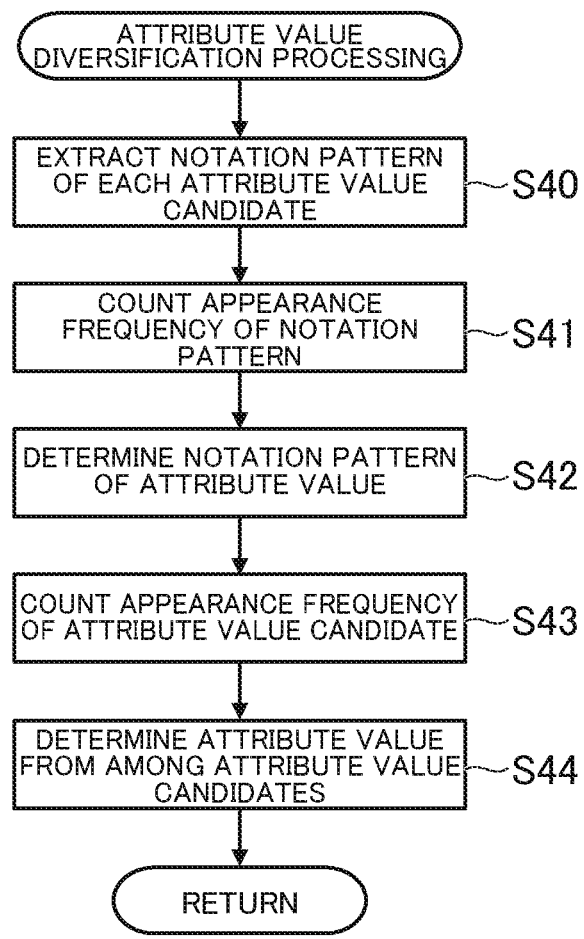
FIG. 7 is a flowchart for illustrating an example of attribute value diversification processing to be executed in Step S4.

FIG. 7 is a flowchart for illustrating an example of the attribute value diversification processing to be executed in Step S4. As illustrated in FIG. 7, the control unit 11 extracts the notation pattern of the attribute value candidates (Step S40). In Step S40, the control unit 11 breaks down the parts of speech of the symbol string indicated by each attribute value candidate, and extracts the notation pattern.

The control unit 11 counts the appearance frequency of the notation pattern for each attribute (Step S41). In Step S41, the control unit 11 counts, for each attribute, the number of attribute value candidates written in each notation pattern, and acquires the counted result as the appearance frequency. The control unit 11 acquires an appearance frequency for each combination of an attribute and a notation pattern.

The control unit 11 determines the notation patterns (notation patterns extracted as the attribute value) of the attribute values for each attribute based on the appearance frequency counted in Step S41 (Step S42). In Step S42, the control unit 11 determines, for each attribute, as the notation pattern of the attribute value, the notation pattern having the k-th (k is natural number) highest appearance frequency based on the counting result obtained in Step S41. The value of k may be any value, and the value of k may be different for each attribute.

The control unit 11 counts the appearance frequency of the attribute value candidate for each combination of an attribute and a notation pattern (Step S43). In Step S43, the control unit 11 counts the number of appearances of each attribute value candidate, and acquires the counted result as the appearance frequency. The control unit 11 acquires an appearance frequency for each combination of an attribute, a notation pattern, and an attribute value candidate.

The control unit 11 determines an attribute value from among the attribute value candidates based on the appearance frequency counted in Step S43 (Step S44). In Step S44, the control unit 11 determines, as the attribute value, the attribute value candidate having the n-th (n is natural number) highest appearance frequency based on the counting result obtained in Step S43. The value of n may be any value, and the value of n may be different for each attribute.

Returning to FIG. 6, the control unit 11 executes training data generation processing based on the attribute value diversification processing of Step S4 (Step S5). The training data generation processing is processing of generating the initial data of the training data DT. In Step S5, the control unit 11 acquires, as the initial data of the training data DT, a combination of the attribute integrated in Step S3 and the attribute value determined in Step S4.

The control unit 11 causes the learner L to learn based on the initial data of the training data DT generated in Step S5 (Step S6). In Step S6, the control unit 11 calculates the feature vector of the attribute value indicated in the training data DT, and adjusts the coefficient of the algorithm in the learner L such that the probability indicating a degree of similarity to the feature vector is calculated. The control unit 11 then sets the algorithm in the learner L such that the attribute is assigned to the symbol information having a probability equal to or more than a threshold value.

The control unit 11 executes web page tagging processing based on the learner L caused to perform learning in Step S6 (Step S7). The tagging processing is processing of assigning an attribute to symbol information in a web page. In Step S7, the control unit 11 inputs the web pages stored in the web page database DB to the learner L, and identifies, from among the pieces of symbol information included in the web page, a piece of symbol information to which an attribute has been assigned. The learner L assigns, as a label, an attribute having a probability equal to or more than a threshold value to the symbol information forming the introductory description and the like of the accommodation facility in the web page.

The control unit 11 executes cleaning processing based on a predetermined condition (Step S8). The cleaning processing of Step S8 is processing of removing the attribute (label) assigned to symbol information that is not an attribute value in the tagging processing of Step S7.

Figure 8:
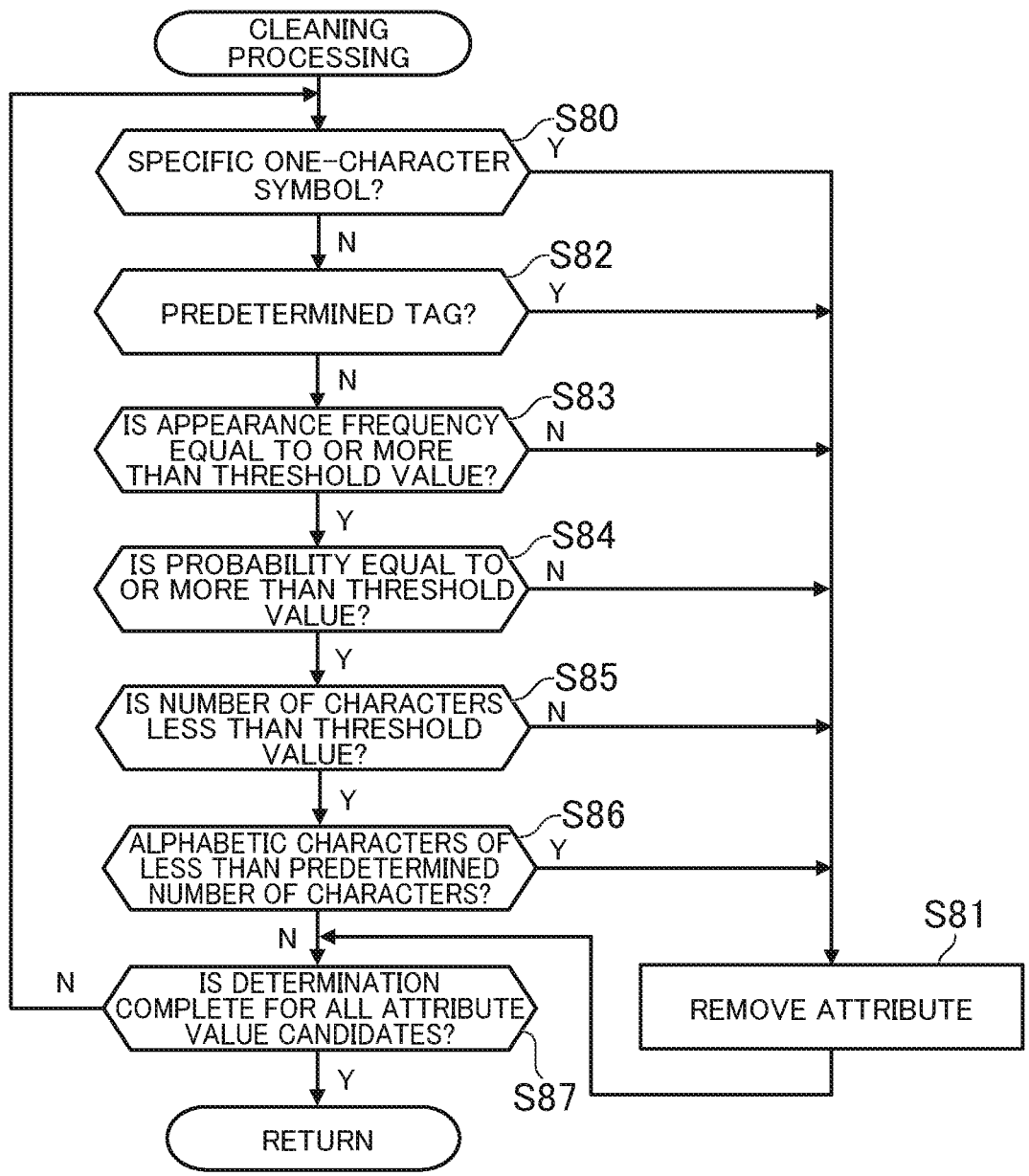
FIG. 8 is a flowchart for illustrating an example of cleaning processing to be executed in Step S8.

FIG. 8 is a flowchart for illustrating an example of the cleaning processing to be executed in Step S8. As illustrated in FIG. 8, the control unit 11 determines whether or not the symbol information to be processed is a specific one-character symbol (Step S80). The symbol information to be processed is any of pieces of symbol information to which the learner L has assigned an attribute in the tagging processing of Step S7.

In Step S80, the control unit 11 determines whether or not the symbol information to be processed is a specific one-character symbol such as "*" or ";". Symbols such as "*" and ";" are obviously not attribute values, and hence the attribute is removed. The specific symbol is not limited to the examples described here, and may be any type of symbol determined in advance. For example, symbols such as ":" and "=" may correspond to the specific symbol.

When it is determined that the symbol information to be processed is a specific one-character symbol (Step S80: Y), the control unit 11 removes the attribute from the symbol information to be processed (Step S81), and advances the processing to Step S87, which is described later. In Step S81, the control unit 11 removes the attribute assigned by the learner L from the symbol information to be processed. In other words, the control unit 11 changes from a state in which an attribute is assigned to the symbol information to be processed to a state in which an attribute is not assigned to the symbol information to be processed.

Moreover, when it is not determined that the symbol information to be processed is a specific one-character symbol (Step S80: N), the control unit 11 determines whether or not the symbol information to be processed is a predetermined tag (Step S82). In Step S82, the control unit 11 determines whether or not the symbol information to be processed is a predetermined tag, for example, a TABLE tag in a markup language. Such symbols do not indicate the content of a web page but merely a tag, and are obviously not symbol information to be processed. Therefore, the attribute is removed.

When it is determined that the symbol information to be processed is a predetermined tag (Step S82: Y), the processing advances to Step S81, and the control unit 11 removes the attribute from the symbol information to be processed.

Moreover, when it is not determined that the symbol information to be processed is a predetermined tag (Step S82: N), the control unit 11 determines whether or not the appearance frequency of the symbol information to be processed is equal to or more than a threshold value (Step S83). In Step S83, the control unit 11 counts the number of extracted pieces of symbol information to be processed, and acquires the counted number as the appearance frequency. The threshold value may be any value determined in advance, and any value may be set as the threshold value. For example, the threshold value may be set to about the top 80% of the appearance frequencies. Symbol information having an appearance frequency that is less than the threshold value is information that is not often used in the web pages, and hence the attribute is removed.

When it is not determined that the appearance frequency of the symbol information to be processed is equal to or more than the threshold value (Step S83: N), the processing advances to Step S81, and the control unit 11 removes the attribute from the symbol information to be processed.

Meanwhile, when it is determined that the appearance frequency of the symbol information to be processed is equal to or more than the threshold value (Step S83: Y), the control unit 11 determines whether or not the probability of the symbol information to be processed calculated by the learner L is equal to or more than a threshold value (Step S84). In Step S84, the control unit 11 determines whether or not the probability is equal to or more than the threshold value by referring to the probability calculated in the processing in which the learner L has assigned the attribute. The threshold value may be any value determined in advance, and any value may be set as the threshold value. For example, the threshold value may be set to about 70% when the probability is expressed as a percentage. Symbol information having a probability that is less than the threshold value has a low likelihood of being an assigned attribute, and hence the attribute is removed.

When it is not determined that the probability is equal to or more than the threshold value (Step S84: N), the processing advances to Step S81, and the control unit 11 removes the attribute from the symbol information to be processed.

Meanwhile, when it is determined that the probability is equal to or more than the threshold value (Step S84: Y), the control unit 11 determines whether or not the number of characters of the symbol information to be processed is less than a threshold value (Step S85). In Step S85, the control unit 11 determines whether or not the symbol information to be processed is a long sentence. The threshold value may be any value determined in advance, and any value may be set as the threshold value. For example, a threshold value of about 30 characters may be set. Symbol information that is too long a sentence is not an attribute value, and hence the attribute is removed.

When it is not determined that the number of characters is less than the threshold value (Step S85: N), the processing advances to Step S81, and the control unit 11 removes the attribute from the symbol information to be processed.

Meanwhile, when it is determined that the number of characters is less than the threshold value (Step S85: Y), the control unit 11 determines whether or not the symbol information to be processed is alphabetic characters of less than a predetermined number of characters (Step S86). In Step S86, the control unit 11 determines whether or not the number of characters of the symbol information to be processed is less than a predetermined number of characters, and determines whether or not the character type of the symbol information to be processed is an alphabetic character. The predetermined number of characters may be any value determined in advance, and any value may be set as the predetermined number. For example, the number of characters may be set to about 3 characters. Alphabetic characters of less than 3 characters are not an attribute value, and hence the attribute is removed.

When it is determined that the symbol information to be processed is alphabetic characters of less than the predetermined number of characters (Step S86: Y), the processing advances to Step S81, and the control unit 11 removes the attribute from the symbol information to be processed.

Moreover, when it is not determined that the symbol information to be processed is alphabetic characters of less than the predetermined number of characters (Step S86: N), the symbol information to be processed is set as an attribute value without removing the attribute, and is added to the training data DT in the processing of Step S9, which is described later. The symbol information to be processed is stored in the web page database DB in the processing of Step S11, which is described layer, and used as a web page index. The control unit 11 then determines whether or not the determination processing of all pieces of symbol information to be processed is complete (Step S87).

When there is apiece of symbol information to be processed that is not determined (Step S87: N), the processing returns to Step S80, and determination processing is performed on the next piece of symbol information to be processed.

Moreover, when it is determined that the determination processing of all attribute value candidates is complete (Step S87: Y), the processing returns to the processing of FIG. 6, and the control unit 11 expands the training data DT based on the cleaned attribute value candidates (Step S9). In Step S9, the control unit 11 adds the symbol information whose attribute has not been removed by the cleaning processing of Step S8 to the training data DT as a new attribute value.

The control unit 11 then causes the learner L to additionally learn based on the training data DT expanded in Step S9 (Step S10). The details of processing of Step S10 are the same as those of Step S6, but while learning is executed based on the initial data of the training data DT in Step S6, in Step S10 learning is executed based on the training data DT expanded in Step S9.

The control unit 11 determines whether or not the tagging processing of all the web pages is complete (Step S11). In Step S11, the control unit 11 determines whether or not the tagging processing of Step S7 has been executed on all the web pages stored in the web page database DB.

When there is a web page for which the tagging processing has not been completed (Step S11: N), the processing returns to Step S7, and the tagging processing is executed on the next web page.

Meanwhile, when the tagging processing of all the web pages is complete (Step S10: Y), the control unit 11 stores the combinations of attributes and attribute values in the web page database DB in association with the web page ID (Step S11), and the processing ends. The combinations of attributes and attribute values stored in the web page database DB are used as an index of the web page.

With the learning system S described above, learning based on symbol information that is not originally an attribute value can be prevented by acquiring symbol information classified by the learner L as an attribute value candidate, and controlling additional learning by the learner L using attribute value candidates based on a determination result of whether or not the symbol or the symbol string indicated by the attribute value candidate satisfies a predetermined condition. As a result, the accuracy of the learner L in semi-supervised learning can be enhanced. As described above, in semi-supervised learning, in which learning is performed repeatedly, a decrease in accuracy leads to a further decrease in accuracy, and hence a decrease in the accuracy of the learner L can easily occur due to an erroneous detection of an attribute value. However, through enhancement of the accuracy of the training data DT by improving the extraction accuracy of the attribute values, such a decrease in accuracy can be prevented, and the accuracy of the learner L can be enhanced. Even when there are few attribute values in the initial data of the training data DT, the training data DT can be expanded with a high level of accuracy, and hence the time and effort required for preparing the initial data can be effectively reduced.

Through restriction of addition of the attribute value candidates for which the determination result obtained by the determination module 104 is not a predetermined result to the training data DT as a new attribute value candidate, and restriction of additional learning by the learner L using such attribute value candidates, erroneous information that is not originally an attribute value can be prevented from being added to the training data DT, and the accuracy of the learner L can be effectively enhanced. More specifically, the occurrence of a decrease in accuracy causing a further decrease in accuracy can be more effectively prevented.

Learning based on symbol information having less than a predetermined number of characters that is not originally an attribute value and learning based on symbol information having a predetermined number of characters or more that is not originally an attribute value can be prevented by controlling the additional learning of the learner L using attribute value candidates based on a determination result of whether or not the symbol or the symbol string indicated by the attribute value candidate has less than a predetermined number of characters. As a result, the accuracy of the learner L in semi-supervised learning can be effectively enhanced.

Learning based on the symbol information of a specific type of symbol or symbol string that is not originally an attribute value can be prevented by controlling the additional learning by the learner L using attribute value candidates based on a determination result of whether or not the symbol or the symbol string indicated by the attribute value candidate is a specific type of symbol or symbol string. As a result, the accuracy of the learner L in semi-supervised learning can be effectively enhanced.

Learning based on the symbol information of a tag portion that is not originally an attribute value can be prevented by controlling the additional learning by the learner L using attribute value candidates based on a determination result of whether or not the symbol or the symbol string indicated by the attribute value candidate is a tag portion. As a result, the accuracy of the learner L in semi-supervised learning can be effectively enhanced.

The accuracy of the learner L in semi-supervised learning can be effectively enhanced by control ling the additional learning of the learner L using attribute value candidates based on the appearance frequency of the attribute value candidates, and performing the additional learning based on the attribute values for which a feature of each attribute is more apparent.

The accuracy of the learner L in semi-supervised learning can be effectively enhanced by control ling the additional learning of the learner L using attribute value candidates based on the probability of the attribute value candidates calculated by the learner L, and performing the additional learning based on the attribute values for which a feature of each attribute is more apparent.

The generation processing for the initial data can be automated and the time and effort required for generating the initial data can be reduced by, of the structured portion of a web page, extracting the symbol information written in a predetermined notation pattern and generating the initial data of the training data DT. The portion of the structured portion in which the attributes and attribute values are written can be identified in advance, and hence the accuracy of the initial data can be enhanced. When there is a bias in the notation patterns, only attribute values having a specific pattern can be extracted, but through provision of variation in the notation patterns, the coverage of the attribute values can be enhanced.

Attribute values for which a feature of each attribute is more apparent can be included in the initial data and the accuracy of the initial data can be enhanced by acquiring the appearance frequency of each of a plurality of notation patterns, and generating the initial data by extracting as an attribute value the symbol information written in a notation pattern that appears in a predetermined frequency or more. The coverage of the attribute values can be effectively enhanced by extracting attribute values having a high frequency notation pattern.

5. Modification Examples

The present invention is not limited to the embodiment described above, and can be modified suitably without departing from the spirit of the present invention.

(1) For example, in semi-supervised learning, it is possible to add more attribute values by extracting attribute values from a variety of viewpoints, and hence it is easier to expand the training data DT. Therefore, the training data DT may be expanded by using a plurality of learners L having viewpoints different from each other. The viewpoints are the algorithms in the learner L. When the viewpoints are different, the coefficients of the algorithms in the learners L are different. Learning based on different pieces of training data enables learners L having different viewpoints from each other to be prepared.

Figure 9:
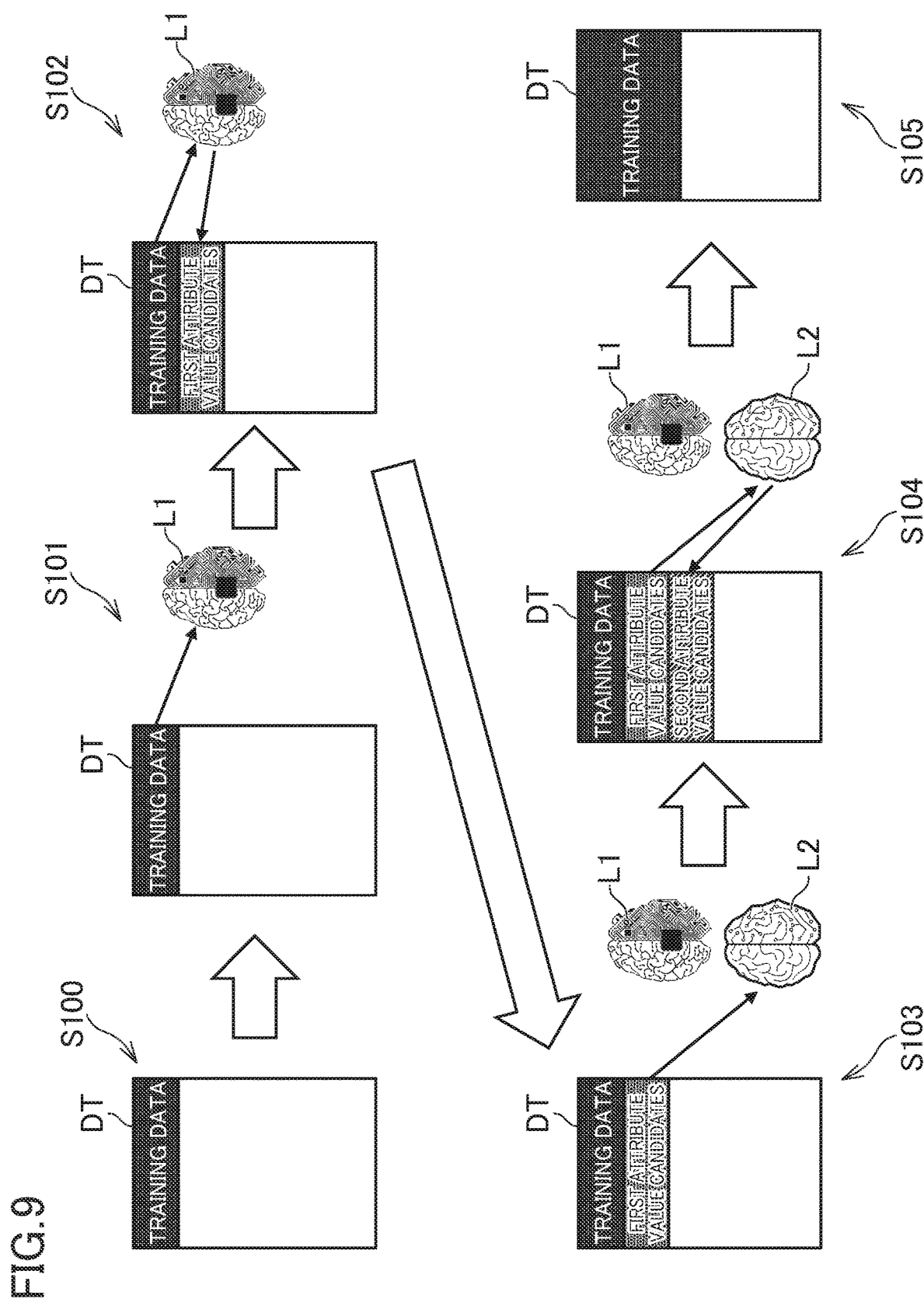
FIG. 9 is an explanatory diagram of processing in a modification example.
Figure 10:
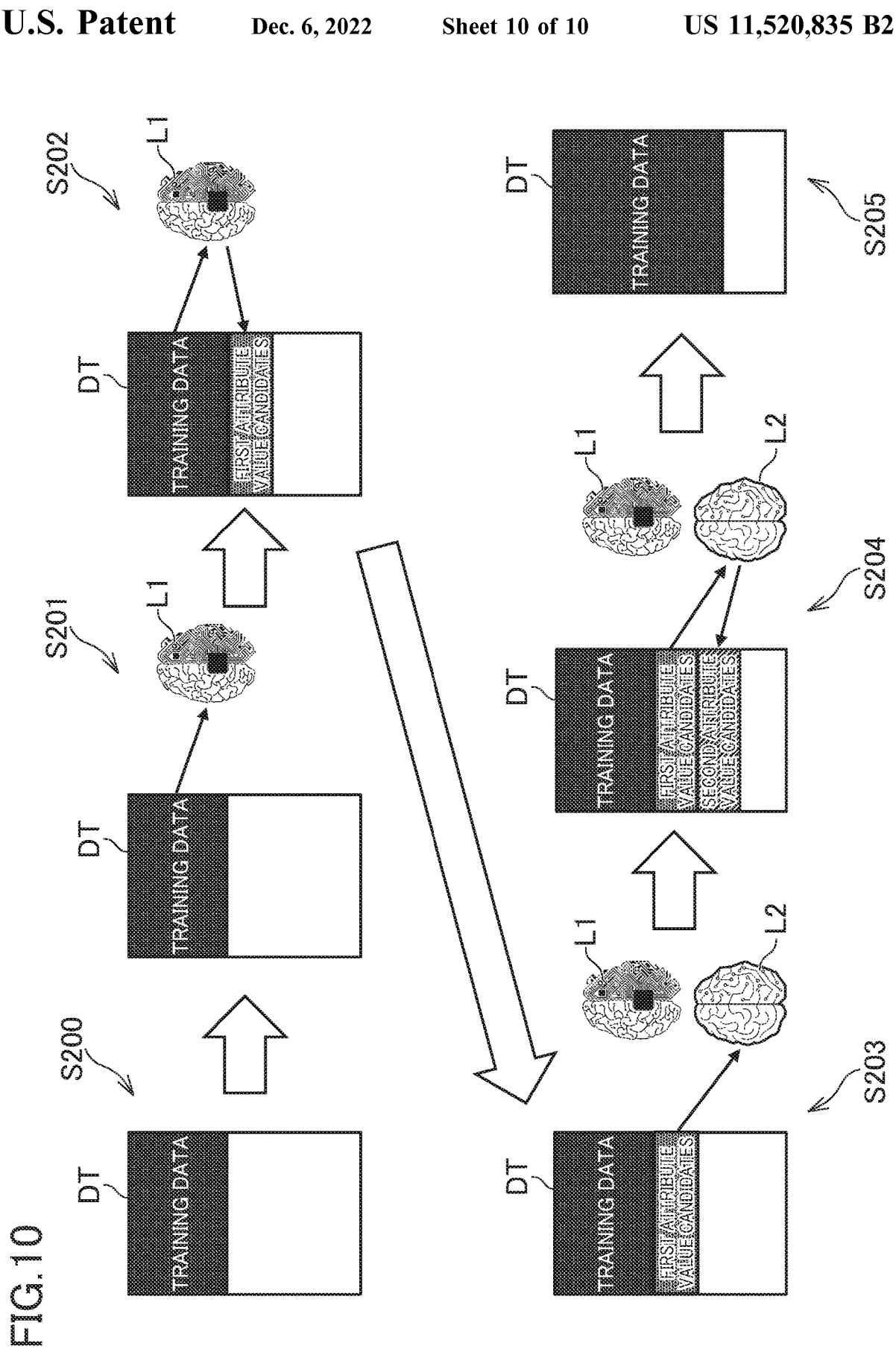
FIG. 10 is an explanatory diagram of processing in the modification example.

FIG. 9 and FIG. 10 are explanatory diagrams of the processing in the modification examples. As illustrated in FIG. 9, first, the generation module 101 generates the initial data of the training data DT (Step S100). The learning module 102 causes a first learner L1 to learn based on the initial data of the training data DT (Step S101). The method of generating the initial data and the learning method based on the initial data are as described in the embodiment.

The acquisition module 103 inputs each of a plurality of web pages to the first learner L1, and acquires, as first attribute value candidates, the symbol information to which an attribute has been assigned by the first learner L1 (Step S102). The method of acquiring the attribute value candidates is as described in the embodiment. Cleaning may be executed when an attribute value candidate is acquired, but in Modification Example (1), cleaning is not executed at the stage of Step S102.

The learning module 102 causes a second learner L2 to learn based on the first attribute value candidates (Step S103). In Step S103, the learning module 102 may cause the second learner L2 to learn based on the initial data of the training data DT and the first attribute value candidates (i.e., by using, as new training data, data obtained by adding first attribute value candidates to initial data of training data DT), or may cause the second learner L2 to learn based on only the first attribute value candidates (i.e., by using only first attribute value candidates as training data). This learning may be performed in any manner, as long as the second learner L2 is caused to learn from a viewpoint different from that of the first learner L1. The learning method itself is as described in the embodiment.

The acquisition module 103 inputs each of a plurality of web pages to the second learner L2, and acquires, as second attribute value candidates, the symbol information to which an attribute has been assigned by the second learner L2 (Step S104). The method of acquiring the attribute value candidates is as described in the embodiment. The web pages input to the second learner L2 may be the same as or different from the web pages input to the first learner L1. For example, the acquisition module 103 may input to the second learner L2 each of a plurality of web pages different from the plurality of web pages input to the first learner L1. In other words, the acquisition module 103 inputs to the second learner L2 a plurality of web pages not input to the first learner L1. In this way, more attribute value candidates can be extracted when web pages different from the web pages input to the first learner L1 are input to the second learner L2.

The determination module 104 determines whether the symbol or the symbol string indicated by each of the first attribute value candidates and the second attribute value candidates satisfies a predetermined condition, and the additional learning control module 105 controls the additional learning using each of the first attribute value candidates and the second attribute value candidates based on the determination result obtained by the determination module 104 (Step S105). The determination method itself of the determination module 104 is as described in the embodiment. Determination is performed on both of the first attribute value candidates and the second attribute value candidates. The additional learning control module 105 removes, of the first attribute value candidates and the second attribute value candidates, attributes from the attribute value candidates determined not to be an attribute value, and does not add those attribute value candidates as a new attribute value to the training data DT. As a result, it is easier to expand the training data DT compared with a case in which only one learner is used.

The training data DT is expanded by the learning module 102, the acquisition module 103, the determination module 104, and the additional learning control module 105 by repeatedly executing the processing described above as one cycle. As illustrated in FIG. 10, when the first cycle ends, the processing of the second cycle is executed.

As illustrated in FIG. 10, in the second cycle, the training data DT expanded in the first cycle is acquired as the initial data, and the same processing as in Step S100 to Step S105 is executed (Step S200 to Step S205). As indicated by the training data DT in Step S205, the training data DT is in an even more expanded state than the training data DT of the first cycle. The web pages used in the second cycle may be the same as or different from those used in the first cycle.

When web pages different from the web pages input in the first cycle are used in the second cycle, more attribute value candidates can be extracted.

According to Modification Example (1), more attribute value candidates are extracted through use of learners L having different viewpoints from each other, and thus the accuracy of the learners L can be effectively improved.

When the web pages input to the second learner L2 are different from the web pages input to the first learner L1, more attribute value candidates can be extracted.

(2) For example, in the embodiment, there is described a case in which the attribute value diversification processing is executed in Step S4 of FIG. 6, and more notation pattern attribute values are extracted. The learning system S may also execute the attribute value diversification processing without executing the cleaning processing of Step S8 described in the embodiment, and without particularly having a configuration for removing attributes from the attribute value candidates that are not attribute values. Specifically, the attribute value diversification processing may be executed by omitting the processing of the determination module 104 and the processing of the additional learning control module 105.

(3) For example, as in Modification Example (1), the learning system S may extract more attribute value candidates by using learners L having different viewpoints from each other, without executing the cleaning processing of Step S8 described in the embodiment, and without particularly having a configuration for removing attributes from attribute value candidates that are not attribute values. Specifically, the processing of the determination module 104 and the processing of the additional learning control module 105 may be omitted, and the training data DT may be expanded by using a plurality of learners L.

(4) For example, in the embodiment, there is described a case in which attributes are stored in the first column and the attribute values are stored in the second column of the web page table, but the storage place of the attributes and the attribute values is not limited to the above-mentioned storage place. The attributes and the attribute values may both be stored in a place determined in advance in the structured portion. For example, the attributes may be stored in the second column name of the table, and the attribute values may be stored in the first column. As another example, the attributes may be stored in a predetermined row of the table, and the attribute values may be stored in another row.

For example, in the embodiment, there is described a case in which the generation module 101 generates the initial data of the training data DT, but the initial data may be generated manually by an administrator of the learning system S. For example, in the embodiment, there is described a case in which the initial data is generated by using web pages, but the initial data may be generated by using other information, for example, a search history. In the case of using the search history, the search conditions input by the user may be stored in the initial data as attribute values.

For example, in the embodiment, the web pages of accommodation facilities are used as an example, but various types of web pages may be used. For example, combinations of attributes and attribute values may be extracted from web pages relating to electronic commerce, distribution of applications, distribution of music, insurance services, or financial services. Further, for example, while web pages have been described above as an example of the documents, various types of documents may be applied to the present invention. For example, the documents may be documents such as legal documents, technical documents, meeting materials, catalogs, or electronic books.

For example, there has been described a case in which attributes and attribute values extracted from documents are used for the search, but the attributes and the attribute values may be used for another purpose. For example, the attributes and the attribute values may be used for the purpose of creating a summary of the document.

For example, there has been described a case in which the initial data of the training data DT is generated by extracting combinations of attributes and attribute values from a description having a table format, but the initial data of the training data DT may be generated by extracting combinations of attributes and attribute values from a description having a semi-structured text format. Further, for example, the processing of integrating attributes having the same meaning is not always required, and character strings having different notations may be set as attributes different from each other.

For example, there has been described a case in which each function is implemented by the server 10, but the functions may be shared by a plurality of computers. For example, the functions may be shared between the server 10 and the user terminal 20, or the functions may be shared among a plurality of server computers. In this case, the functions may be shared by transmitting and receiving the processing results via a network. Further, for example, the data described as being stored in the data storage unit 100 may be stored in a computer other than the server 10.

The invention claimed is:

1. A learning system, comprising at least one processor configured to:
   cause a learner, which is configured to classify symbol information included in each of a plurality of documents, to learn based on training data indicating an attribute value of each of a plurality of attributes;
   input each of the plurality of documents to the learner to acquire the symbol information classified by the learner as an attribute value candidate;
   determine whether a symbol or a symbol string indicated by the attribute value candidate satisfies a predetermined condition to expand the training data; and
   control, based on a determination result, additional learning by the learner using the attribute value candidate.

2. The learning system according to claim 1, wherein the at least one processor is configured to restrict an addition of an attribute value candidate for which the determination result is not a predetermined result to the training data as a new attribute value, and restrict additional learning by the learner using the attribute value candidate.

3. The learning system according to claim 1, wherein the at least one processor is configured to determine whether the symbol or the symbol string indicated by the attribute value candidate has less than a predetermined number of characters.

4. The learning system according to claim 1, wherein the at least one processor is configured to determine whether the symbol or the symbol string indicated by the attribute value candidate is a specific type of symbol or symbol string.

5. The learning system according to claim 1,
   wherein each of the plurality of documents is written in a markup language, and
   wherein the at least one processor is configured to determine whether the symbol or the symbol string indicated by the attribute value candidate is a tag portion.

6. The learning system according to claim 1, wherein the at least one processor is configured to control additional learning by the learner using the attribute value candidate based further on an appearance frequency of the attribute value candidate.

7. The learning system according to claim 1, wherein the at least one processor is configured to control additional learning by the learner using the attribute value candidate based further on a probability of the attribute value candidate, which is calculated by the learner.

8. The learning system according to claim 1, wherein the at least one processor is configured to generate initial data of the training data by extracting, from each of the plurality of documents, symbol information written in a predetermined notation pattern as an attribute value.

9. The learning system according to claim 8, wherein the at least one processor is configured to generate the initial data by acquiring an appearance frequency of each of a plurality of notation patterns from each of the plurality of documents, and extracting, as an attribute value, symbol information written in a notation pattern appearing in a predetermined frequency or more.

10. The learning system according to claim 1, wherein the at least one processor is configured to:
cause a first learner to learn based on the training data,
input each of the plurality of documents to the first learner to acquire, as a first attribute value candidate, symbol information to which an attribute has been assigned by the first learner,
cause a second learner to learn based on the first attribute value candidate,
input each of a plurality of documents to the second learner to acquire, as a second attribute value candidate, symbol information to which an attribute has been assigned by the second learner,
determine whether the symbol or the symbol string indicated by each of the first attribute value candidate and the second attribute value candidate satisfies the predetermined condition, and
control additional learning using each of the first attribute value candidate and the second attribute value candidate based on a determination result.

11. The learning system according to claim 10, wherein the at least one processor is configured to input, to the second learner, each of a plurality of documents different from the plurality of documents input to the first learner.

12. A learning method, comprising:
causing a learner, which is configured to classify symbol information included in each of a plurality of documents, to learn based on training data indicating an attribute value of each of a plurality of attributes;
inputting each of the plurality of documents to the learner to acquire the symbol information classified by the learner as an attribute value candidate;
determining whether a symbol or a symbol string indicated by the attribute value candidate satisfies a predetermined condition to expand the training data; and
controlling, based on a determination result, additional learning by the learner using the attribute value candidate.

13. A non-transitory computer-readable information storage medium for storing a program for causing a computer to:
cause a learner, which is configured to classify symbol information included in each of a plurality of documents, to learn based on training data indicating an attribute value of each of a plurality of attributes;
input each of the plurality of documents to the learner to acquire the symbol information classified by the learner as an attribute value candidate;
determine whether a symbol or a symbol string indicated by the attribute value candidate satisfies a predetermined condition to expand the training data; and
control, based on a determination result, additional learning by the learner using the attribute value candidate.

* * * * *